US 7,991,868 B2

(12) United States Patent
Meyer et al.

(10) Patent No.: US 7,991,868 B2
(45) Date of Patent: Aug. 2, 2011

(54) SYSTEM AND METHOD FOR TRANSPORTING DATA UNITS THROUGH A COMMUNICATION NETWORK

(75) Inventors: Michael Meyer, Aachen (DE); Henning Wiemann, Aachen (DE); Reiner Ludwig, Hurtgenwald (DE); Joachim Sachs, Aachen (DE); Stephan Baucke, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 966 days.

(21) Appl. No.: 11/909,453

(22) PCT Filed: Mar. 23, 2005

(86) PCT No.: PCT/EP2005/003113
§ 371 (c)(1),
(2), (4) Date: Oct. 9, 2007

(87) PCT Pub. No.: WO2006/099883
PCT Pub. Date: Sep. 28, 2006

(65) Prior Publication Data
US 2009/0240817 A1 Sep. 24, 2009

(51) Int. Cl.
*G06F 15/173* (2006.01)
(52) U.S. Cl. ......... 709/223; 709/203; 709/219; 709/224
(58) Field of Classification Search .................. 709/223, 709/228, 224, 203, 217, 219
See application file for complete search history.

(56) References Cited

U.S. PATENT DOCUMENTS

| 7,330,432 | B1 * | 2/2008 | Revsin et al. | 370/235 |
|---|---|---|---|---|
| 7,489,705 | B2 * | 2/2009 | Sachs et al. | 370/467 |
| 7,580,385 | B2 * | 8/2009 | Bosch et al. | 370/328 |
| 7,673,211 | B2 * | 3/2010 | Meyer et al. | 714/748 |
| 2003/0123481 | A1 | 7/2003 | Neale et al. | |
| 2003/0229809 | A1 * | 12/2003 | Wexler et al. | 713/201 |
| 2004/0103310 | A1 * | 5/2004 | Sobel et al. | 713/201 |
| 2004/0243703 | A1 * | 12/2004 | Demmer et al. | 709/224 |
| 2006/0171364 | A1 * | 8/2006 | Bosch et al. | 370/338 |
| 2006/0224770 | A1 * | 10/2006 | Ekstrom et al. | 709/238 |

FOREIGN PATENT DOCUMENTS

WO WO 2005/013083 A 2/2005

OTHER PUBLICATIONS

Rijsinghani; RFC Computation of the Internet Checksum via Incremental Update; May 1994; pp. 1-6; Network Working Group; Digital Equipment Corporation; Littleton, MA, USA.

3GPP Organizational Partners; 3GPP-TS-26.233 Transparent End-to-End Packet Switched Streaming Service (PSS) General Description (Release 7); http://www.3gpp.org; Jun. 2007; pp. 1-14; v7.0.0; Valbonne, France.

(Continued)

*Primary Examiner* — Lashonda T Jacobs (57) ABSTRACT

A system and method for transporting data units for a communication network. In a communication between two peers a proxy and a network entity for controlling a partial communication are provided. One or both of the proxy and the network entity is arranged to modify one or more of the data units, in order to provide communication control related information that is different from communication control related information exchanged between the two peers The respective other or both of the proxy and the network entity is arranged to perform data unit transmission control based on the different communication control related information.

24 Claims, 10 Drawing Sheets

OTHER PUBLICATIONS

3GPP Organizational Partners; 3GPP-TS-26.234 Transparent End-to-End Packet Switched Streaming Service (PSS); Protocols and Codecs; (Release 7); http://www.3gpp.org; Sep. 2007; pp. 1-149; v7.4.0; Valbonne, France.

Dina Katabi et al, "Congestion Control for High Bandwidth-delay Product Networks". SIGCOMM'02, Aug. 19-23, 2002, Pittsburgh Pennsylvania.

S. Kunniyur, "AntiECN Marking: A Marking Scheme for High Bandwidth Delay Connections", May 2003, Proceedings RCC Alaska.

* cited by examiner

SYSTEM AND METHOD FOR TRANSPORTING DATA UNITS THROUGH A COMMUNICATION NETWORK

FIELD OF THE INVENTION

The present application relates to a system and method for transporting data units through a communication network, where the data units belong to a communication of a predetermined layer between two peers of a predetermined protocol of said predetermined layer, and the communication is carried over the communication network.

BACKGROUND OF THE INVENTION

In data unit based communication, an amount of data is divided into a plurality of data units, where the structure of the data units and the rules involved in transmitting the data units from a so-called sending peer to a so-called receiving peer are determined by a given communication protocol. This is well known and does not need to be explained in further detail. It is noted that in the context of the present specification and claims, the term "data unit" is used generically and relates to all types of data divisions which may have different names in connection with different protocols and communication techniques, such as packets, segments, frames, datagrams, protocol data units (PDUs), service data units (SDUs), etc.

In the communication between a given sending peer and a given receiving peer, many problems can occur. Such problems will depend on many factors, e.g. the specific control mechanisms provided in the protocol or protocols being used, characteristics and capabilities of the communication networks over which the data units are transported, etc. This generally leads to the situation that if certain problems relating to the characteristics for capabilities of certain network types are recognised, then corresponding changes in communication protocols can be suggested. As an example, it is known that the congestion control of TCP (Transmission Control Protocol) does not work very efficiently for wireless networks, in particular if sudden changes in data rate occur, e.g. due to channel type switching in wideband CDMA or similar effects. In order to deal with this problem several concepts to improve congestion control performance have been made, such as AntiECN and XCP (Explicit Control Protocol). XCP is e.g. described in "Congestion Control for High Bandwidth-Delay Product Networks" by Dina Katabi et al., SIGCOMM' 02, Aug. 19-23, 2002, Pittsburgh Pa., USA, and AntiECN is e.g. described in the Article "AntiECN Marking: A Marking Scheme for High Bandwidth Delay Connections" by S. Kunniyur, Proceedings RCC Alaska, May 2003.

XCP generalizes the concept of the Explicit Congestion notification in that routers inform senders about the degree of congestion. The idea is that an XCP router computes feedback that causes the system consisting of sender and receiver to converge to an optimal efficiency. In this way, the network explicitly tells the sender the state of congestion and how to react to it.

In AntiECN, the routers along a connection can set a single bit in data units being forwarded, where the single bit indicates that the router is under-utilized. Each router along a path judges its own degree of utilization, and if one router determines that it is being over-utilized, the bit is changed to a value reflecting this over-utilization and subsequent routers cannot change it to the value reflecting under-utilization (this is accomplished by performing an AND operation with respect to the bit value in received data units). The receiving peer echoes the bit back to the sending peer in an acknowledgement (ACK) data unit. If the bit indicates under-utilization, then the sending peer can increase its congestion window (and thereby its rate).

The problem involved in adapting such suggested improvements to a given protocol lies on the one hand in having to change or update the protocol implementations in all potential sending and receiving peers, and the usefulness of such suggestions also usually depends on the number of networks and network entities (such as routers) that make use of the suggested improvement. As a consequence, it is typically very difficult to put such suggested improvements to actual practice.

Another suggestion for alleviating transmission control problems that are due to specific network characteristics and capabilities is to use so-called Performance Enhancing Proxies (PEPs), see RfC 3135. A proxy or proxy server is a computer system or router that breaks the protocol connection between a sending peer and a receiving peer. The proxy can act on behalf of the sending peer and/or the receiving peer. For example, a proxy can analyze the acknowledgement messages, coming back from a receiving peer, and can suppress certain acknowledgements, like duplicate acknowledgements if it is determined that this would be detrimental to overall performance.

Another suggestion for alleviating transmission control problems that are due to specific network characteristics and capabilities is to use so-called Performance Enhancing Proxies (PEPs). A proxy or proxy server is a computer system or router that breaks the protocol connection between a sending peer and a receiving peer. The proxy can act on behalf of the sending peer and/or the receiving peer. For example, a proxy can analyze the acknowledgement messages, coming back from a receiving peer and can suppress certain acknowledgements, like duplicate acknowledgements if it is determine that this would be detrimental to overall performance.

OBJECT OF THE PRESENT INVENTION

It is the object of the present invention to provide an improved system and method for transporting data units through a communication network.

SUMMARY OF THE INVENTION

This object is solved by the system and method described in the independent claims of the present application. Advantageous embodiments are described in dependent claims. In accordance with the concept of the present invention, in a communication between a sending peer and a receiving peer, a proxy of the predetermined layer arranged between the two peers is used, and a network entity for controlling a partial connection of the communication network that carries data units between the sending peer and receiving peer is also involved. Such a network entity can e.g. be a controller responsible for controlling a radio link. An example of such a controller is an RNC (Radio Network Controller).

In accordance with the invention, one or both of the proxy and the network entity is arranged to modify one or more of the data units that are being transported. The modification is in accordance with rules for coding information that are different from rules for coding information specified by the end-to-end protocol used by the sending peer and the receiving peer. As an example, if the end-to-end connection is TCP, then the differently coded (enhanced) control information can e.g. be information suggested in AntiECN or XCP. In this way communication control related information that is different from communication control related information exchange between the two peers can be provided from the proxy to the network entity, or from the network entity to the proxy, such that the proxy and/or the network entity can appropriately perform data unit transmission control based on this communication control related information that is different from the communication control related information exchange between the sending peer and the receiving peer.

In this way, it is possible to employ enhanced flow control mechanisms, such as AntiECN and/or XCP between the proxy and the network entity, without having to employ such enhanced mechanisms in the sending peer, the receiving peer, or in any other entity involved in the communication that is outside of the path between the proxy and the network entity in question. In this way, the present invention can be easily put to practice, as only very few elements need to be changed in order to let the invention become highly effective.

Furthermore, the enhancements for flow control that are used between the proxy and the network entity can be specifically adapted to the communication network. In other words, if the communication network is a wireless network, then enhancements specifically useful for wireless networks can be used, but it is not necessary to at the same time implement enhancements that are useful for other types of networks, but not for wireless networks. Equally, in networks of some other type, enhancements useful for that type can be employed, without having to at the same time also use enhancements that only provide advantages in wireless networks.

Although the present invention can be applied in the context of any type of network, the application in a wireless network is a preferred embodiment.

In a general sense, a concept of the invention consists in providing an additional information exchange between the proxy and the network entity. This leads to two basic situations, namely a feed-forward situation where the upstream element (proxy or network entity) sends information to the downstream element, where the stream is defined by the direction from sending peer to receiving peer, and the feedback situation, in which information is signalled from the downstream element to the upstream element.

It is noted that the interaction of two elements is an important distinction to known proposals for enhancing performance by use of proxies, because such proposals always deal with the proxy alone.

Feed-forward information can be information about the transmission rate, round trip time or a congestion window of the upstream element. An example is the information used in the congestion header of XCP. Further examples of feed-forward information are information about the enhancement capabilities available at the upstream element, e.g. if there is a plurality of possible flow control enhancement features. Another example of feed-forward information are configuration parameters to be used by the downstream element.

Feedback information can be information about changes in transmission rates, round trip time or the pipe capacity for the flow of data units being transported. For example, this could be information about a new transmission rate or congestion window to be used by the upstream element, or it could be information about the change in a threshold, e.g. the slow start threshold known in TCP) to be used by the upstream element, or a value quantifying the amount of change (e.g. in rate) to be taken into account by the upstream element, or an indication that a change in link properties has occurred (AntiECN). Another example of feedback information is information about the available enhancement capabilities, e.g. if a plurality of flow control enhancement features is available.

BRIEF DESCRIPTION OF FIGURES

Detailed embodiments of the present invention will now be described with reference to the accompanying Figures, where.

DETAILED DESCRIPTION OF EMBODIMENTS

Figure 1:
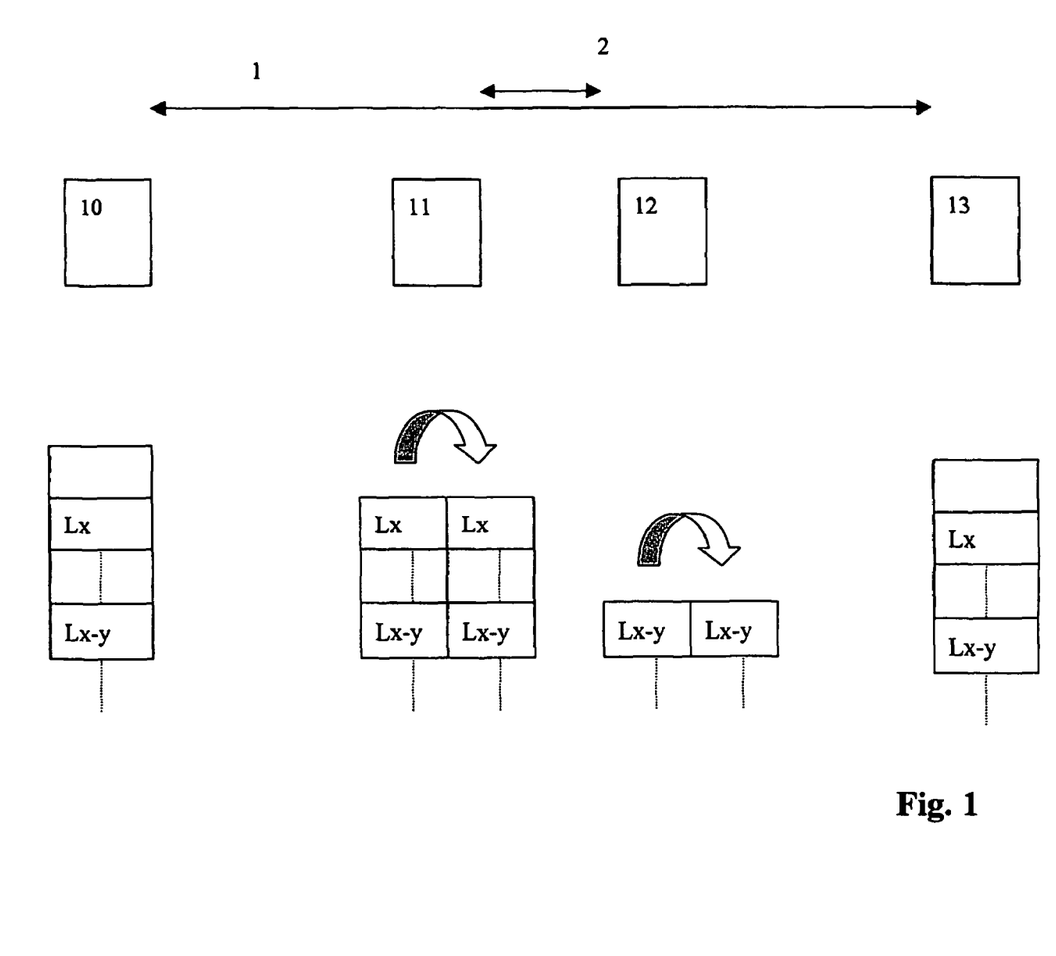
FIG. 1 shows a basic diagram of a system embodiment of the present invention.

FIG. 1 gives a basic overview of a system according to the present invention. In the figures reference numerals 10 and 13 relate to two peers of a predetermined layer (e.g. the transport layer) of a predetermined protocol (e.g. TCP) of said layer. In the communication exchange 1 between the two peers 10 and 13, a proxy 11 and a network entity 12 are provided. The proxy 11 belongs to the same layer as the two peers and breaks the connection 1 between the two peers 10 and 13. The network entity 12 serves to control a partial connection of the overall connection 1, e.g. a link towards the peer 13. In a preferred embodiment, the network entity 12 controls a wireless link.

As can be seen, the network entity 12 does not have to operate at the layer on which the connection 1 between the peers 10 and 13 operates. In fact, it preferably operates at a lower layer, e.g. at the link layer when the path 1 is established at the transport layer. In this case, the data units associated with the protocol of connection 1 are relayed, but the network entity 12 does not appear at the level of that protocol's layer. This is indicated in the layering diagram at the bottom of FIG. 1, where Lx symbolizes the layer of connection 1 and Lx-y symbolizes the lower layer to which the partial connection controlled by network entity 12 belongs.

In accordance with the invention, one or both of the proxy 11 and the network entity 12 is arranged to modify one or more data units that are being transported from peer 10 to peer 13 or from peer 13 to peer 10. The modification is in accordance with rules for coding information that are different from the rules for coding information specified by the predetermined protocol on which connection 1 is carried. Thereby, communication control related information is provided that is different from communication control related information exchanged between the two peers 10 and 13. For example, if the peers 10 and 13 are standard TCP peers, it is possible to implement enhanced flow control features known from e.g. XCP or AntiECN between the proxy 11 and the network entity 12 by exchanging corresponding enhanced control information.

Communication protocols have rules for coding information. Such rules specify the structure of data units (e.g. that there is a header section and a payload section), define predetermined fields (e.g. bits n to n+20 are an identifier field), define delimiters and indicate what type of information can be found at a certain location in the data unit. In accordance with the invention, the modification employs a set of rules that is different in at least one way from the rules specified by the protocol of which 10 and 13 are peers. Therefore, the difference can e.g. lie in the structure and/or the use of a field and/or the use of delimiters.

The respective other or both of the proxy 11 and the network entity 12 is arranged to perform a data unit transmission control based on the communication control related information that is enhanced with respect to the communication control related information exchanged between the two peers 10 and 13. In other words, the proxy 11 can send such enhanced information to the network entity 12, and then the network entity 12 or both the network entity 12 and the proxy 11 can perform their data unit transmission control in accordance therewith, or the network entity 12 sends the enhanced communication control related information to the proxy 11, and the proxy 11 or both the proxy 11 and the network entity 12 then perform their data unit transmission control based on this enhanced communication control related information.

It is noted that the modification of data units can be done in any suitable or desirable way. It can consist in receiving a given data unit, performing a change in the contents (e.g. changing a specific field), and then forwarding the thus modified data unit. The modification can also consist in first duplicating a given data unit, and then only performing changes in one of the two data units and then forwarding both data units.

If the modification comprises duplicating data units, then it is preferable that the respective receiving partner is capable of preventing the modified (i.e. duplicated and changed) data units fro being forwarded to one of the peers 10, 13. In this way, the communication of enhanced communication control related information between the proxy 11 and network 12 is hidden or isolated from other participants in the overall communication between peers 10 and 13.

The changing of a data unit in the course of the modification, be it the changing of the original data unit or the changing of a duplicated data unit, may comprise adding a section, e.g. a special header. In addition to or as an alternative to adding a section, the operation of changing a data unit in accordance with different rules for coding information may comprise changing one or more predetermined sections of a data unit, e.g. a specific field in a given header or in the payload.

The modified data units carry information coded in a different way than determined by the rules for coding information specified by the protocol according to which the peers 10 and 13 operate. In other words, information is coded that is not provided for in the protocol governing the exchange between peers 10 and 13, such that it is of no use or could even lead to problems in peers 10 and 13. As an example, such a different rule could be the provision of the under-utilization indication bit described in connection with AntiECN.

It is preferred that one or both of the proxy 11 and the network entity 12 are arranged to bring modified data units into-accordance with the rules for coding information specified by the predetermined protocol before forwarding received data units to one of the peers 10 or 13. In other words, if the proxy 11 and/or network entity 12 receive a data unit in which enhanced flow control information was added, and where this information is of no use to the peer 10, 13 to which the data unit is to be transported, then the proxy 11 or network entity 12 removes the additional information and arranges the structure and contents of the data unit in such a way that it again fully conforms to the rules for coding information specified by the protocol to which peers 10 and 13 adhere.

In the event that the modification comprises a duplication, it is also possible to perform a change in a header section of a duplicated data unit and to remove the payload section, in order to reduce the burden on the network transporting the data units. In one preferred embodiment of the invention, the system is arranged in such a way that the different set of rules used for modification and the set of rules used by the protocol of which 10 and 13 are peers are such that the modified data units are discarded at the peers 10, 13. Such a concept is especially useful if the element performing the modification, be it the proxy or the network entity, cannot be sure of whether modified data units all pass through a corresponding element capable of interpreting the modified data units and then bringing the modified data units back into accordance with the rules of the original protocol and/or being able to remove the modified data units. Expressed differently, if the modified data units are such that they are discarded at the peers 10, 13, then an arrival at one of the peers does not lead to any problems.

The above-specified modification can be achieved in any suitable or desirable way and will generally depend on the specific protocols and rules involved. For example, the discarding of modified data units can be achieved by changing a predetermined field in the data units, which in accordance with the protocol used by peers 10, 13 comprises information for use in checking the integrity of the data units at a receiver, e.g. a checksum field.

Figure 8:
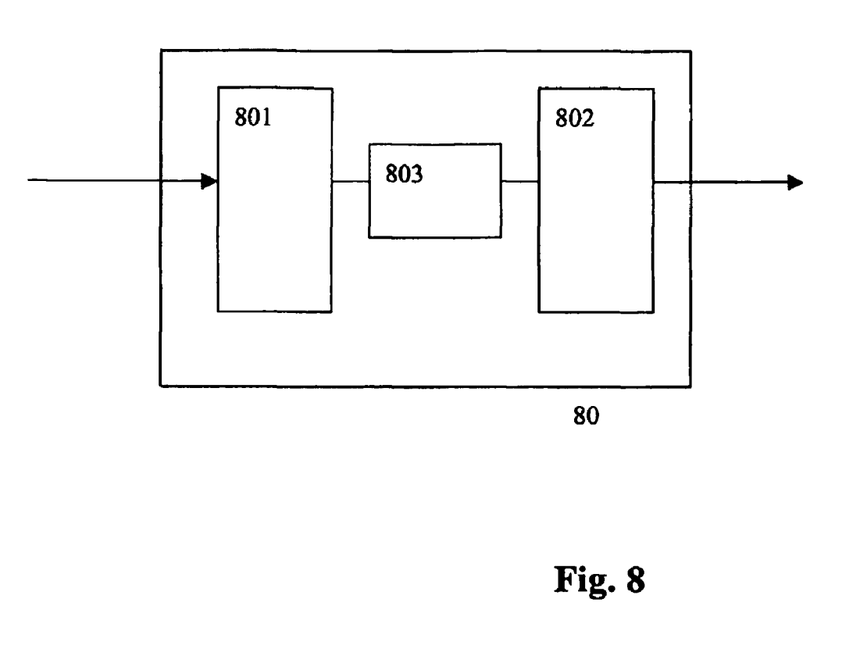
FIG. 8 is a block diagram showing a proxy or network entity that is operable in accordance with embodiments of the present invention.

FIG. 8 shows a schematic example of the structure of a proxy 11 or network entity 12 operable in accordance with the present invention. The unit 80, which can act as the proxy 11 or network entity 12 comprises a receive buffer 801 for holding incoming data units and a send buffer 802 for holding outgoing data units. A control unit 803 is provided for managing the receive buffer 801 and the send buffer 802, and for performing the modification of data units in accordance with the invention. Furthermore, if the unit 80 receives modified data units, then the control unit 803 can be arranged to perform the demodification of data units and/or the filtering out of modified data units. The control unit 803 can be provided in any suitable or desirable way, e.g. as a programmable processor on which appropriate routines are implemented.

Now, examples of the present invention that indicate a flow direction from sending peer to receiving peer and possibly a feedback direction will be described with reference to FIGS. 2, 3, 6 and 7.

Figure 2A:
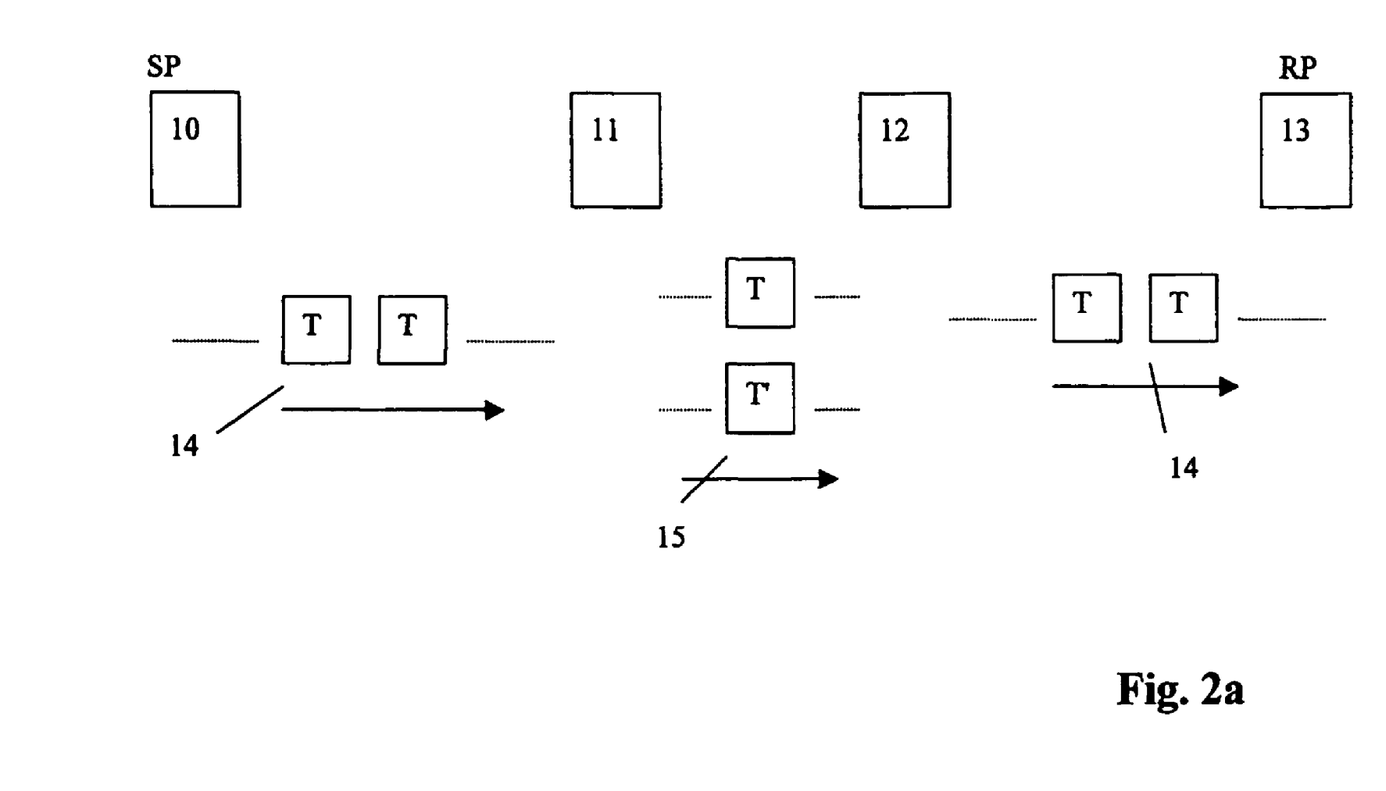
FIGS. 2a and 2b illustrate the transport and modification of data units if the proxy is an upstream element and the network entity a downstream element.
Figure 2B:
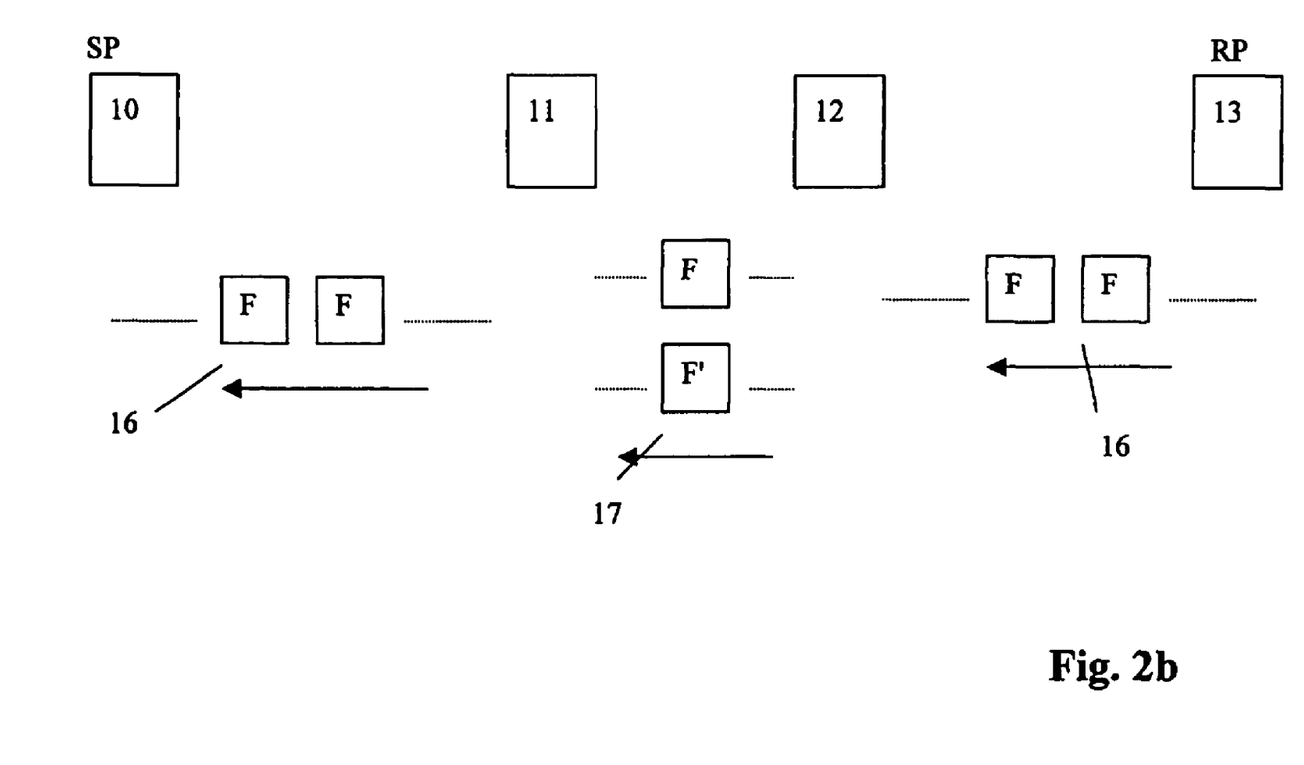
Figure 6:
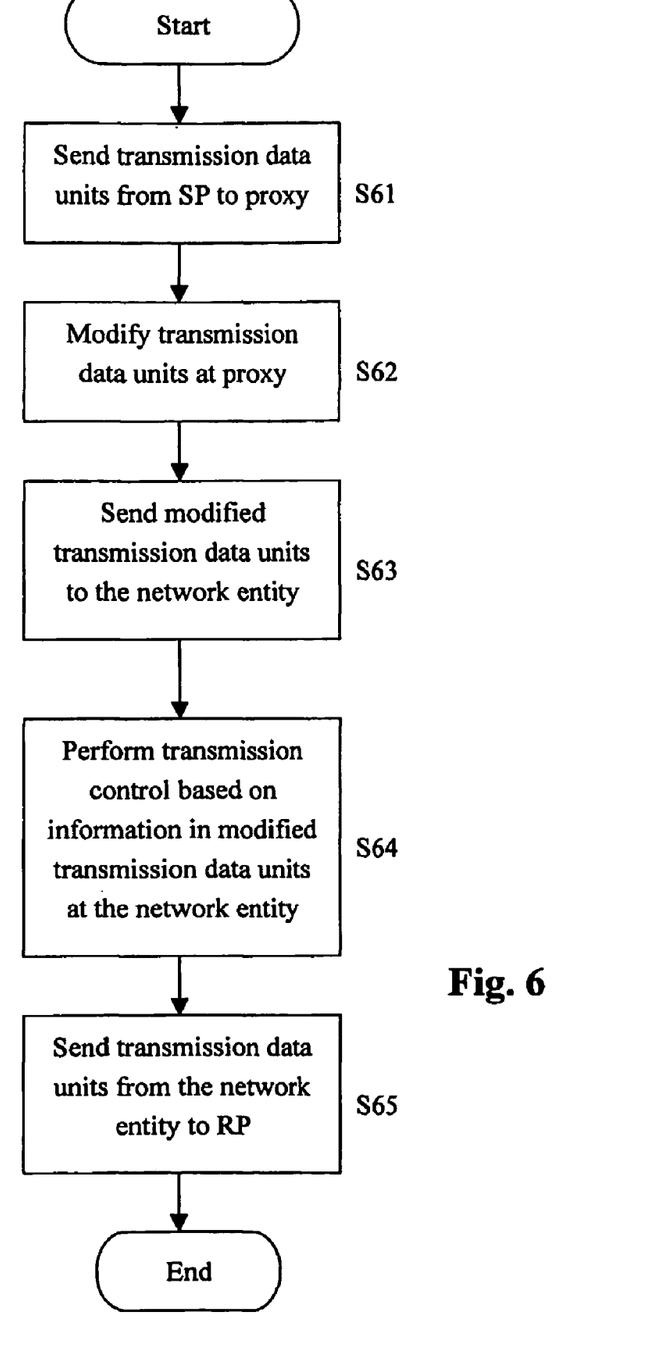
FIG. 6 is a flow chart showing a method embodiment of the present invention.
Figure 7:
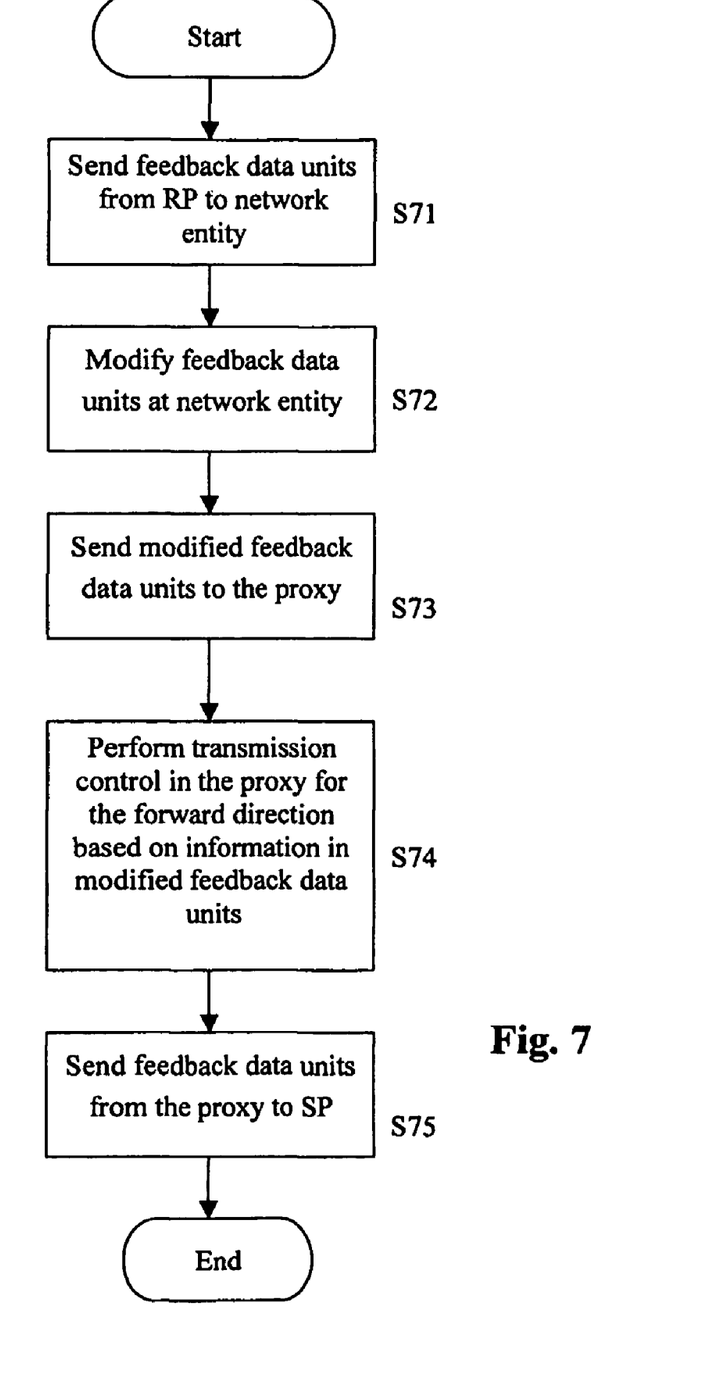
FIG. 7 is a flow chart showing another method embodiment of the present invention.

FIGS. 2a and 2b show a situation where peer 10 is the sending peer (SP) and peer 13 is the receiving peer (RP). FIG. 6 shows a flow chart explaining the transport of transmission data units from sending peer 10 to receiving peer 13. FIG. 2b shows a situation in which the receiving peer 13 sends feedback messages to the sending peer 10. FIG. 7 is a flow chart showing the steps involved in sending these feedback messages.

Figure 3A:
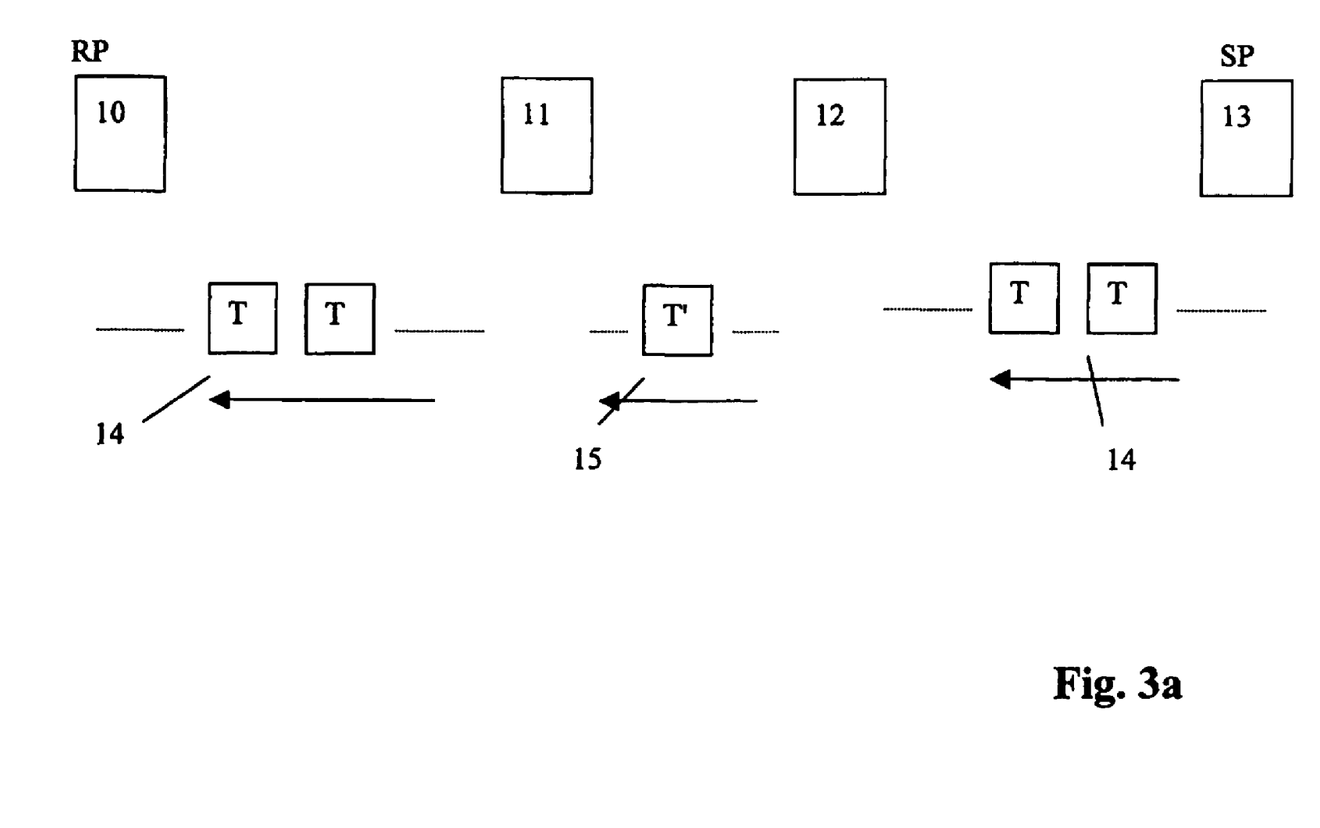
FIGS. 3a and 3b illustrate the transport and modification of data units if the proxy is a downstream element and the network entity an upstream element.
Figure 3B:
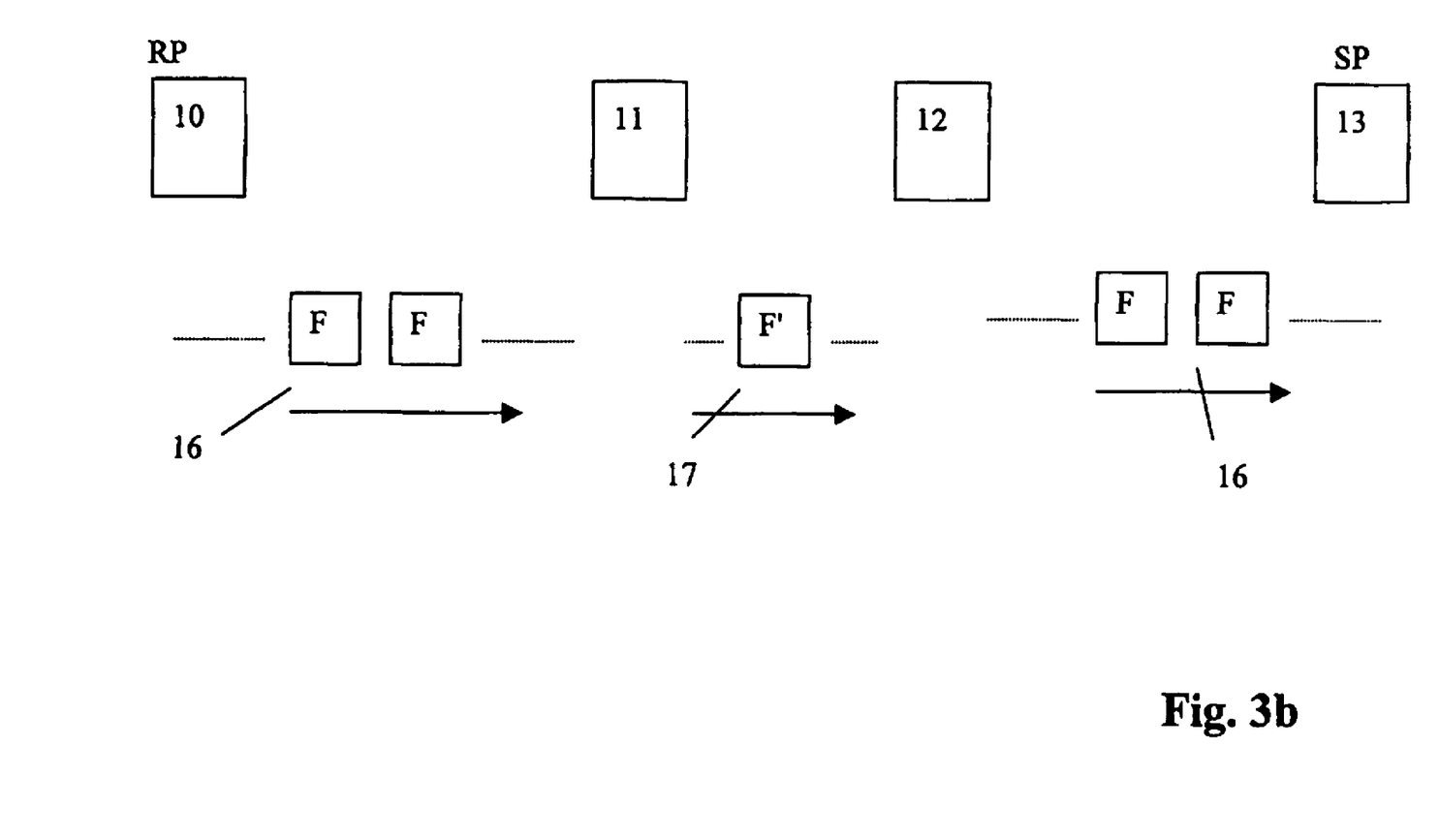

FIGS. 3a and 3b show the mirror image situation with respect to FIG. 2, i.e. in FIG. 3 peer 13 is the sending peer and peer 10 is the receiving peer.

In FIG. 2a the sending peer 10 sends transmission data units 14 towards the receiving peer 13, see step S61 in FIG. 6. It is noted that the term "transmission data unit" is a generic expression for those data units sent from the sending peer in the direction of the receiving peer, whereas the term "feedback data unit" is a generic expression for data units sent in the opposite direction.

The proxy 11 receives the transmission data units 14 and performs a modification in accordance with one or more of the above-described embodiments, see step S62 in FIG. 6. In the example of FIG. 2a, the modification comprises a duplication and changing of data units to thereby generate modified data units 15. As shown in step S63 of FIG. 6, the proxy 11 sends the modified data units (in the example unchanged data units and duplicated modified data units 15) to the network entity 12. The network entity 12 receives the modified data units and then performs transmission control based on the information in the modified transmission data units 15, see step S64.

Finally, the network entity 12 sends the transmission data units 14 to the receiving peer 13, see step S65. As can be seen in the example of FIG. 2a, network entity 12 does not forward the modified data units 15. This is preferably, in order to avoid an unnecessary burden on the transmission network and to avoid possible problems at the receiving peer 13, but if the modification is done in such a way that modified data units are discarded at the receiving peer 13, then it is possible to let the network entity 12 also forward the modified data units 15.

FIG. 2b shows a situation where the protocol used for sending transmission data units from sending peer 10 to receiving peer 13 provides for the emission of feedback data units 16 that contain information related to the receipt of the transmission data units 14. An example for such feedback data units are the well known acknowledgement messages ACK in TCP.

As indicated in step S71 of FIG. 7, the receiving peer 13 sends the feedback data units 16 to the network entity 12. The network entity 12 is arranged to receive the feedback data units 16 from the receiving peer 13 and send the feedback units to the proxy 11. As shown in step S72, the network entity 12 modifies the feedback data units in order to produce modified feedback data units 17. Similar to the example of FIG. 2a, the modification process shown in FIG. 2b comprises duplicating data units and changing the content in the duplicated data units.

In step S73 the modified data units 17 are sent to the proxy 11, where the proxy 11 performs transmission control for the forward direction (i.e. the direction of transmission data units from sending peer 10 to receiving peer 13 shown in FIG. 2a) based on information in the modified feedback data units 17. The proxy 11 is arranged to send the feedback data units 16 to the sending peer 10, see step S75. Similar to the operation of network entity 12 in FIG. 2a with respect to the transmission data units 14, proxy 11 in the example of FIG. 2b removes the duplicated and changed data units 17.

Now an example of the inverse situation will be described with reference to FIGS. 3a and 3b. It is noted that the flow charts for corresponding methods are very similar to those of FIGS. 6 and 7, except that the proxy and the network entity are exchanged, such that flow charts corresponding to the situation of FIGS. 3a and 3b are not shown for the purpose of simplicity and to avoid repetition.

In FIG. 3a the network entity 12 is arranged to receive transmission data units 14 from peer 13, which is acting as sending peer, and network entity 12 is arranged to send the transmission data units to proxy 11. The network entity 12 is arranged to perform a modification on the transmission data units in order to generate modified data units 15. In the example of FIG. 3a there is no duplication such that only changed data units 15 are forwarded from the network entity 12 to the proxy 11.

FIG. 3b shows the sending of feedback data units 16 from receiving peer 10 towards sending peer 13. Proxy 11 is arranged to receive the feedback data units 16 from the receiving peer 10 and to send feedback data units to the network entity 12. Proxy 11 is arranged to perform a modification on the feedback data units 16, where in the example of feedback 3b the modification does not comprise duplication. The network entity 12 receives the modified data units 17 and performs transmission control for the forward direction (for transmission data units in the direction from sending peer 13 to receiving peer 10) in accordance with the enhanced information in the modified feedback data units 17. Finally, the network entity 12 is arranged to send the feedback data units 16 to sending peer 13. In the example of FIG. 3b, network entity 12 has demodified the modified data units 17 in order to reproduce the original feedback data units 16 (more specifically: bring them back into accordance with rules of the end-to-end protocol governing peers 10 and 13).

Although FIGS. 2 and 3 describe the application of the concept of the present invention in both the forward direction (from sending peer to receiving peer) as well as in the feedback direction (from receiving peer to sending peer), it is to be noted that the invention can be applied independently in either direction. In other words, it is possible to perform the modification and addition of enhanced supplementary information only in the forward direction (see FIGS. 2a and 3a) or only in the feedback direction (see FIGS. 2b and 3b).

In the basic system outlined in FIG. 1, it is preferable that one or both of the proxy 11 and the network entity 12 are arranged to perform a verification procedure for verifying whether the respective other communication partner is able to process the modified data units 15 or 17. The verification procedure can be done in any suitable or desirable way, and can e.g. comprise reading address information contained in the data units that are being transported, or in set-up data units exchanged for setting up the communication, and comparing the address information with stored address information. In other words, if the address information e.g. indicates that the data units are passing through a proxy, then the network entity can look up stored proxy address information, to determine what kind of enhanced flow control capabilities that proxy has, and can then arrange its own flow control procedure and the type of information to be added to modified feedback data units accordingly.

Alternatively or additionally, one or both of the proxy and the network entity can be arranged in such a way that the verification procedure comprises the sending of predetermined signalling messages to the respective other communication partner. In other words, one partner sends a verification request to the other and receives a corresponding answer.

Besides the possibility of implementing a verification procedure for verifying the ability of the respective partner, it is also possible to arrange the proxy and/or network entity to perform a determination procedure for determining the capabilities of the respective other communication partner for reacting to the enhanced communication control related information that is different from the communication control related information exchange between the two peers.

Similar to the verification procedure, the determination procedure may comprise reading address information contained in the data units of the communication or in set-update units exchanged for setting up the communication, in comparing the address information with stored address information, the determination procedure may additionally or alternatively comprise that one or both of the proxy 11 and the network entity 12 sends predetermined signalling messages to the respective other communication partner.

In the following a number of practical examples will be described in the context of a transport layer proxy that is inserted into a TCP connection between a client and a server, and where the communication network is a wireless network, and the network entity is a control unit for controlling a wireless link. However, it is noted that this is only a preferred application, and that the concept of the present invention can be applied to proxies at arbitrary layers, to arbitrary types of communication networks and to arbitrary network entities in such communication networks.

Figure 4:
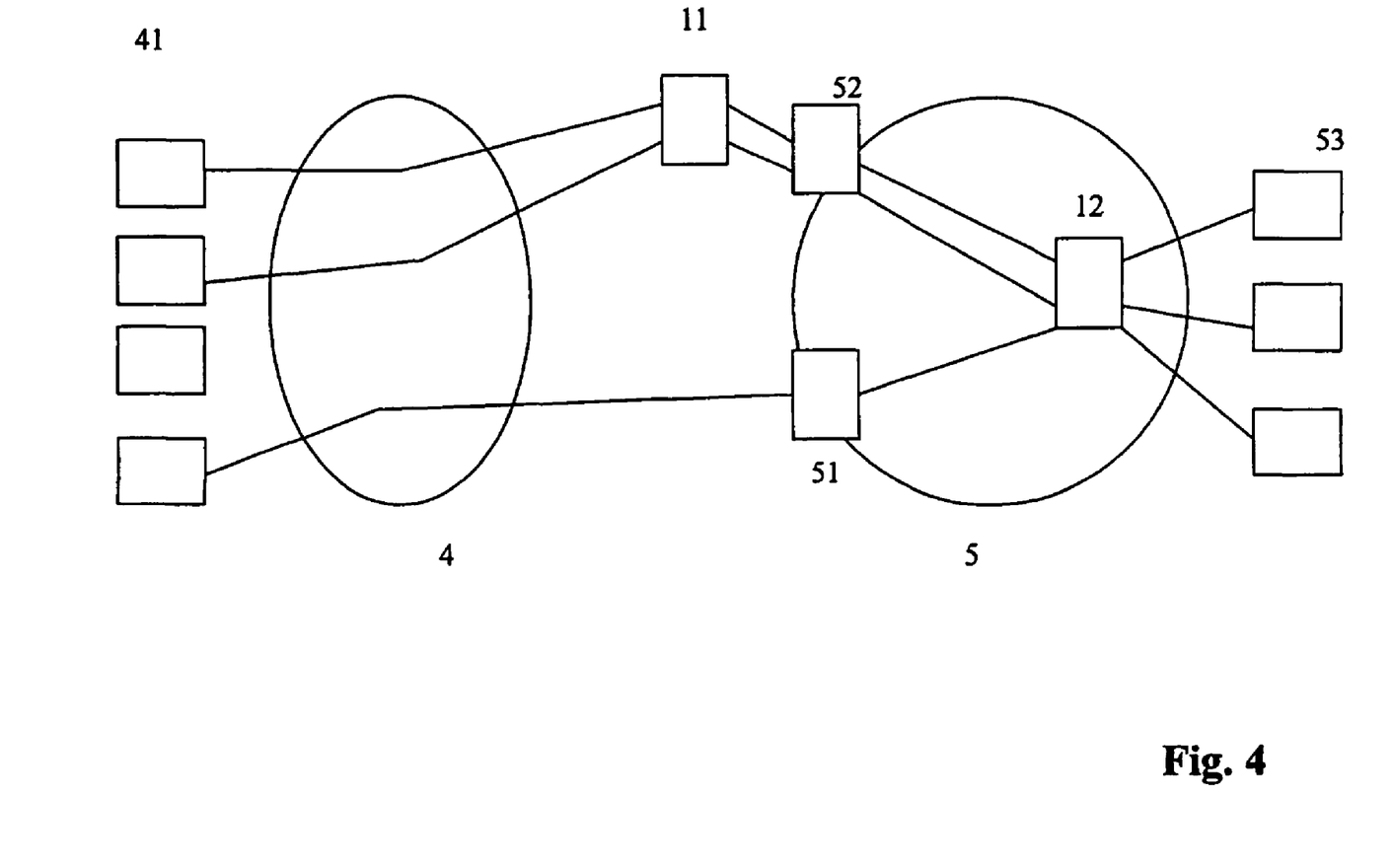
FIG. 4 is a diagram showing the proxy and network entity in a larger network environment.

In FIG. 4 a number of servers 41 communicate with clients 53 via the Internet 4 and a wireless network 5. Reference numeral 11 describes a proxy server and reference numeral 12 a control unit for controlling a wireless link. Reference numerals 51 and 52 refer to gateway entities that provide an interconnection to the wireless network 5. For example, the nodes 51, 52 could be GGSNs (Gateway GPRS Support Nodes) and the network entity 12 could be an RNC (Radio Network Controller).

Figure 5:
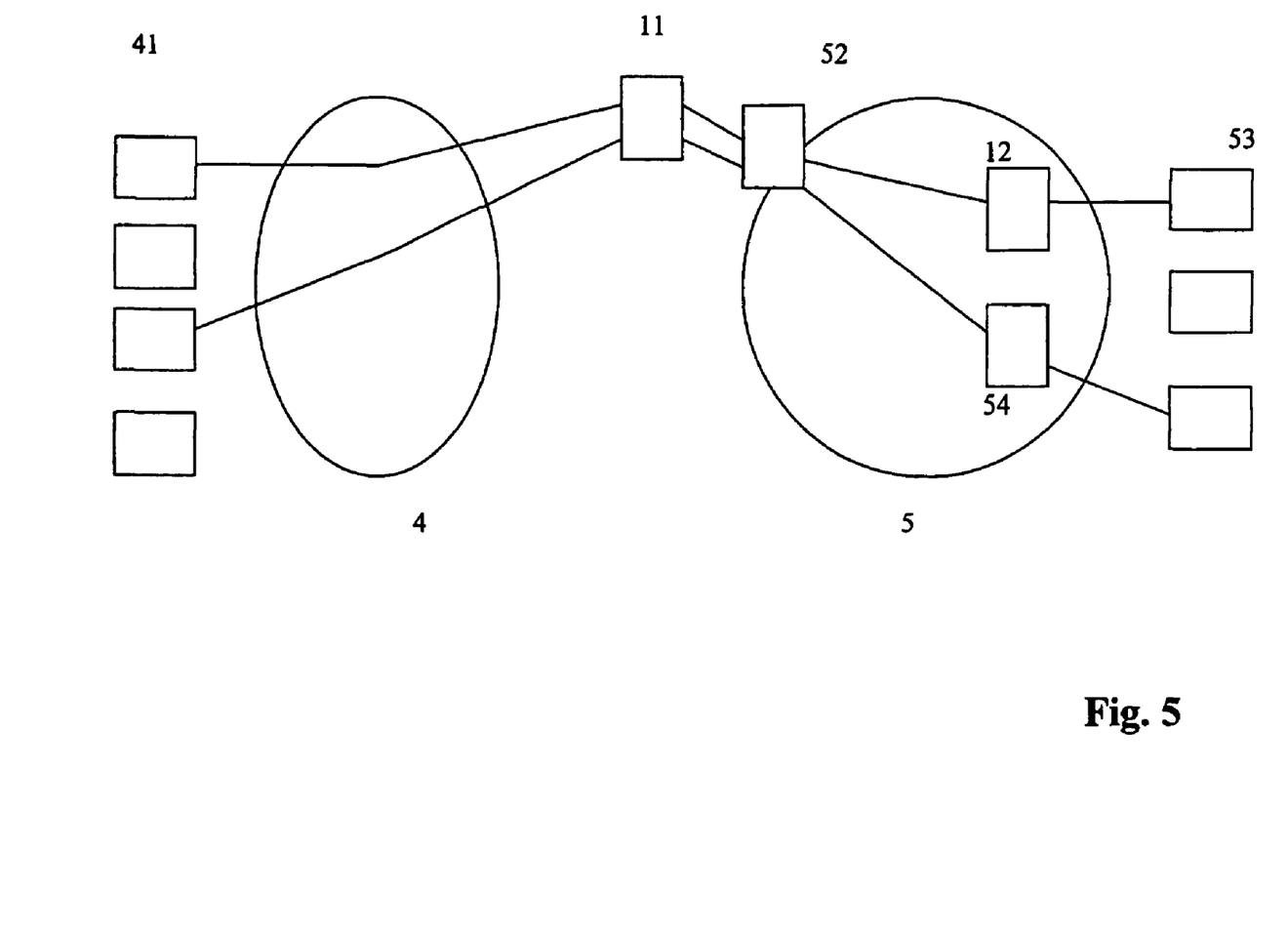
FIG. 5 is a diagram showing another network environment.

FIG. 5 shows the same elements as FIG. 4, such that a repeated description is not necessary, except for an additional link controller 54.

When considering practical situations of servers sending data units to clients over one or more networks, where a proxy and a network entity are involved, then a number of different scenarios is possible.

In a first scenario, it is assumed that all data units passing through the wireless network 5 pass a proxy that is arranged to operate in accordance with the invention, e.g. in being able to modify data units and/or in being able to adjust flow control in response to modified feedback data units, and it is assumed that all link controllers in the network 5 also operate in accordance with the present invention, in correspondence to the operation of the proxies, i.e. can receive and process modified transmission data units and/or can modify feedback data units and add enhanced flow control information for the proxy that is provided upstream. In this scenario, the proxies and link controllers can operate in any one of the above-described ways. Especially, they can be arranged to operate in a very simple way, i.e. there are fixedly arranged, without the necessity of any capability negotiations, because the capabilities of both the proxies and the link controllers can be predetermined, and it is not necessary to take any precautions with respect to the possible forwarding of modified data units to one of the servers or clients, because there will always be an element (be it the proxy or the network entity) in the connection that is capable of removing or demodifying the modified data units.

FIG. 4 shows a different scenario, where one can see that at least one proxy 11 is provided, but that it is also possible that data units arrive at the link controller 12, which did not pass a proxy 11. Naturally, FIG. 4 is only schematic and a real network will comprise a far larger number of link controllers 12, gateway nodes 51, 52 and also more proxies 11. However, the basic scenario that FIG. 4 illustrates is to have one or more network entities 12, which are capable of operating in accordance with the present invention, i.e. generating and/or processing modified data units, but that it cannot be guaranteed that all of the transmission data units have passed through a proxy and that all feedback data units will pass through a proxy capable of operating in accordance with the present invention. When viewed in the transmission direction (from server to client) this scenario can also be referred to as the "upstream problem".

In such a scenario, it is preferable that the network entity 12 first validates that a proxy is active for a given set of data units (e.g. a flow of data units), before modifying feedback data units to convey enhanced communication control related information.

Such a validation can be done in several ways.

For example, in some cases the use of a proxy can be statically bound to a range of client IP addresses or connections to particular gateway nodes (e.g. identified by a certain set of Access Point Names or APNs). The network entity 12 can then determine if a TCP connection runs via a proxy if the client IP address is within the range of IP addresses which are assigned by a gateway node connected to a proxy. Alternatively, the network entity 12 could identify the gateway-proxy pair by the APN that is used to set up a radio access bearer. The APN is transmitted via the network entity in an appropriate message, e.g. in a PDP Context Activation message. In the just described situation, the network entity 12 will have access to a record that establishes which range of client IP addresses or APNs relates to radio access bearers connected via a proxy. Such information will typically be static and can be preset in the network entity 12, e.g. via a suitable operation & maintenance (O & M) interface.

Another way to validate that a proxy is active consists in letting the proxy 11 signal in the transmission or downlink data path that it generates modified data units and is capable of sending enhanced communication control related information. This could e.g. be signalled in a reserved bit of the TCP header, which is checked by the network entity 12, or it could be signalled in a specially marked new data unit. The network entity 12 then knows for which connections it can itself operate in accordance with the invention, i.e. in which it can react to the enhanced communication control related information received in transmission data units and/or itself modify feedback data units and place its own enhanced communication control related information in said modified feedback data units. Preferably, the network entity 12 will reset header fields modified by the proxy and/or delete any new signalling messages introduced by the proxy, in order to avoid an adverse reaction in the clients 53.

The validation can also be performed in a situation in which the user (client) has explicitly selected a proxy and the proxy is addressed in the destination IP address. The network entity 12 then knows that a proxy is being used, by identifying that the IP address of a proxy is being used. For this purpose, the network entity has access to an associated record, which can e.g. be supplied to the network entity 12 via an O & M interface.

FIG. 5 intends to illustrate another scenario, in which case all of the data units passing through the network 5 also pass a proxy (represented by 11 in FIG. 5), but where not all link controllers 12, 54 are capable of operating in accordance with the present invention. More specifically, reference numeral 12 refers to a link controller that can operate in accordance with the present invention, i.e. generate and/or process modified data units, whereas reference numeral 54 relates to a link controller that cannot generate or process modified data units. In terms of the transmission direction from server 41 to client 53, the scenario in FIG. 5 can also be referred to as the "downstream problem".

One possibility is that at radio access bearer set-up, a network entity 12 that is capable of generating and/or processing modified data units and knows that it is connected to a proxy (e.g. based on one of the mechanisms discussed in connection with the scenario of FIG. 4) signals to the proxy via a suitable interface that it is capable of processing and/or generating modified data units.

In order to signal to the proxy, the network entity may obtain or look up the address of the proxy in question. This can be done as described above, e.g. by looking up a record that associates client IP addresses or APNs with proxy IP addresses, or in the event that the user has explicitly selected a proxy, then the proxy IP address can directly be read from data units. The signal from the network entity may comprise a flow identifier of the TCP connection, which is known from the first data unit of the flow. The use of modified data units and enhanced communication control related information should not be used before any capability negotiations between the network entity and proxy have been completed.

In a situation, in which a proxy first sends a signal by modifying transmission data units, in order to inform nodes downstream that it is capable of performing data unit transmission control based on the enhanced communication control related information, there can occur the problem that a receiving node which is not capable of processing the modified data unit might simply discard it, whereby the data unit in question is lost. It is therefore preferable that a proxy in such a case send a separate signal that does not lead to potential data unit loss. For example, this can be achieved by duplicating a transmission data unit and adding the information into the duplicate, as described before. It does not matter if the duplicate (and modified) packet is dropped somewhere downstream. Also, it cannot cause harm at the final receiving peer, as it would be identified as a duplicate. Therefore, it would not interfere with the end-to-end TCP connection between the sending and receiving peer. To reduce signalling overhead, the payload of the duplicate TCP data unit could be removed. As a further option, the TCP checksum field could be deliberately changed to ensure that the data unit is definitely dropped at the receiving peer and not accepted as a normal data unit. The duplicate packet contains the TCP flow information to inform the network entity for which flow the enhanced communication control related information can be used. The signalling from the network entity to the proxy can be accomplished in any of the previously described ways.

In the basic scenario outlined by FIG. 5, the proxy 11 does not modify data units and code the enhanced control related information until it has confirmed that the TCP connection for given data units also uses a network entity capable of processing modified data units and/or capable of generating modified feedback data units. It is therefore the network entity that initiates the use of modified data units and the enhanced communication control related information. The network entity can do this is any suitable or desirable way, e.g. by sending a corresponding control information message that does not disturb the end-to-end TCP connection. For example, one can duplicate a feedback message, as previously described. In this way, the proxy is informed that the network entity supports the use of modified data units and the enhanced communication control related information, and operates accordingly.

Naturally, it is possible to have a scenario in which both the upstream problem and the downstream problem are present, i.e. some TCP connections pass proxies, some do not, and some network entities are capable of processing and/or generating modified data units and some network entities are not. In such a situation, the above-described respective solutions can be combined. According to a preferred embodiment, the system for transporting data units is then arranged in such a way that two prerequisites are fulfilled: each network entity that operates in accordance with the invention knows what kind of enhanced communication control related information is sent by one or more proxies that operate in accordance with the invention and are possibly involved in the connection, and the performed data unit transmission control is feedback based, i.e. the proxies perform data unit transmission control based on enhanced communication control related information sent to them in modified feedback data units from the network entity. Given such conditions, the following solution is possible.

A proxy receives feedback messages in the reverse data path from the network entity for some TCP connections. It performs data unit transmission control in accordance with the enhanced information for those connections or flows, e.g. aggressive pipe capacity probing based on AntiECN, or setting a slow start threshold value based on feedback information from the network entity. The transmission data units sent out by the proxy fully conform to the end-to-end TCP semantics (i.e. to the rules for coding information specified by the end-to-end protocol), such that there are no problems in the forward direction due to modified data units.

An network entity that operates in accordance with the invention sends feedback information to the proxy in accordance with the known capabilities of the proxy. In other words, it is e.g. known, that the proxy is capable of performing AntiECN based flow control, such that the network entity can generate modified feedback data units that contain an AntiECN bit. The information is sent to the proxy in the feedback path. The proxy receives the modified feedback data units and preferably removes the modified feedback data units or demodifies them, i.e. brings them into accordance again with the rules for coding information specified by the end-to-end TCP. Preferably, the feedback data units generated at the RNC are formatted such that they do not interfere with the end-to-end TCP connection. This means that no negative interaction occurs, even if the feedback data unit does not pass a proxy that can filter it out or demodify it. Such an effect can be achieved by e.g. duplicating data units on the reverse path (this can be feedback data units such as acknowledgement messages, but can also be inverse transmission data units), which means that the original data units are not modified. In the duplicated data units a particular feedback code is used. For example, a predetermined bit (e.g. in a reserved field) in the header can indicate to the proxy that the AntiECN flag is set. This flag can also indicate that another non-crucial TCP header field has another meaning (e.g. the checksum field or the advertised window), in order to signal some additional information, like a rate, etc. The feedback code can also refer to the original data unit that was duplicated (e.g. set the slow start threshold to 8 kbyte multiplied by the difference between the advertised window field of the original and the duplicate data unit). If no proxy is available, this data unit will be received as a duplicate data unit at the server and will be ignored. Similar to situations described previously, it is a further option to deliberately set the checksum field (or some other field used for determining the integrity of the data unit) in the header to an invalid value, in order to force that the data unit is discarded in any nodes that operate in accordance with standard TCP but not in accordance with the invention.

When exchanging modified data units between a proxy and a network entity, it is preferable that the modified data units are not forwarded to any nodes outside of the connection part between proxy and network entity. In the forward direction, the network entity can remove all new header fields inserted in the data path by the proxy (this could e.g. be an extension similar to the one used in XCP). The network entity can also reset header fields that have been used for a different purpose than specified by TCP (e.g. use of reserved field in the TCP header). The network entity can also bring any possibly changed integrity fields, such as the checksum into the correct state.

The proxy can remove all new header fields inserted in the feedback path by the network entity (this could e.g. be an extension similar to the one used in XCP). It can also reset header fields that have been used for a different purpose than specified by TCP (e.g. use of reserved fields in the TCP header for convey a AntiECN marking). The proxy can also ensure that any integrity fields are brought into the correct state.

As already mentioned previously, the type of enhanced information exchanged between the proxy and the network entity can be chosen in any suitable or desirable way. Merely for illustrative purposes, AntiECN and XCP based enhanced information will be described in the following.

In the example of AntiECN, the network entity may use one of the unused TCP header fields for introducing an AntiECN marking in the feedback path. If the data rate for the connection increases, this marking is set by the RNC and the header checksum is updated. When the proxy detects that the AntiECN marking is set, it changes its congestion control to be more aggressive (e.g. by changing from congestion avoidance to slow start). It then resets the marking used for AntiECN to the TCP compliant value and recalculates the header checksum.

In the example of XCP, the proxy can add an XCP congestion header to the data unit, which includes information about the current sending rate (congestion window size) and the round-trip time. The network entity strips the congestion header. Depending on the rate available for the user and the link utilization, the network entity determines a feedback value for the proxy how the rate (congestion window) needs to be adapted to achieve better link utilization and/or fairness among flows. The feedback information is added in an option field to the feedback data units in the reverse path. The proxy strips the feedback field and updates the sending rate accordingly. As the exchange of XCP type information is not deployed end-to-end, not all fields of the XCP extension header need to be used (e.g. in the transmission direction path the feedback field is not needed, and in the feedback path the RTT and congestion window fields are not needed).

One option to avoid an extension header is to use a certain field in the TCP header for signalling this information. In the data units this could be the fields conveying the advertised window size, the reserved fields and the checksum fields. For the feedback path this could be the checksum field and the reserved fields.

Although the previous examples have been described with reference to a proxy and a network entity, it is possible that multiple nodes in the network are involved with processing and/or generating modified data units that carry enhanced communication control related information.

It should also be noted that different types of enhanced information can be combined, e.g. that both AntiECN information and XCP information is exchanged. As already mentioned earlier, although the application of the present invention to a wireless communication network is a preferred embodiment, the invention is by no means restricted thereto. The invention can be applied in any type of communication network.

Mechanisms like AntiECN and XCP can also be useful in other networks than wireless networks that experience sudden changes in data rate, as e.g. changes in rate for wirebound connections can be caused by a variety of factors, such as changes in the load on an access network section in a fixed access network. This can e.g. be due to some households disconnecting and thereby adding spare bandwidth on a shared access medium.

Although the present invention has been described with reference to detailed embodiments, this only serves to better illustrate the invention, which is defined by the appended claims. Reference signs in the claims only serve to make the claims easier to read and have no limiting effect.

What is claimed:

1. A method for transporting data units through a communication network, said data units belonging to a communication of a predetermined layer between two peers of a predetermined protocol of said predetermined layer, said communication being carried over said communication network and said communication involving a proxy of said predetermined layer arranged between said two peers, and a network entity for controlling a partial connection of said communication network that carries said data units, the method comprising:
   one or both of said proxy and said network entity modifying one or more of said data units, said modification being in accordance with rules for coding information that are different from rules for coding information specified by said predetermined protocol, in order to provide communication control related information that is different from communication control related information exchanged between said two peers,
   the respective other or both of said proxy and said network entity performing data unit transmission control based on said communication control related information that is different from communication control related information exchanged between said two peers and
   one or both of said proxy and said network entity performing a verification procedure for verifying whether the respective other communication partner of said proxy and network entity is able to process said modified data units.

2. The method of claim 1, wherein said modification comprises adding a section to said data units.

3. The method of claim 1, wherein said modification comprises changing one or more predetermined sections of said data units.

4. The method of claim 3, wherein said predetermined sections are predetermined fields in a data unit header.

5. The method of claim 1, wherein one or both of said proxy and said network entity furthermore brings modified data units into accordance with the rules for coding information specified by said predetermined protocol before forwarding received data units to one of said peers.

6. The method of claim 1, wherein one or both of said proxy and said network entity duplicates a data unit, modifies one of the resulting two data units, and sends both data units.

7. The method of claim 6, wherein one or both of said proxy and said network entity furthermore prevents modified data units from being forwarded to one of said peers.

8. The method of claim 6, wherein said modification comprises changing a header section of the data units and removing a payload section.

9. The method of claim 1, wherein said modification is such that according to said rules for coding information specified by said predetermined protocol, modified data units are discarded at said peers of said predetermined protocol.

10. The method of claim 9, wherein said modification comprises changing a predetermined field in said data units, which predetermined field comprises information for use in checking the integrity of said data units at a receiver.

11. The method of claim 1, wherein said two peers consist of a sending peer (SP) and a receiving peer (RP) of said communication, where said sending peer (SP) is arranged to send transmission data units to said receiving peer (RP).

12. The method of claim 11, wherein said proxy receives said transmission data units from said sending peer (SP) and sends said transmission data units to said network entity, and said network entity sends said transmission data units to said receiving peer (RP), where said proxy performs said modification on said transmission data units.

13. The method of claim 11, wherein said receiving peer (RP) sends feedback data units containing information related to the receipt of said transmission data units to said sending peer (SP), said network entity receives said feedback data units from said receiving peer (RP) and sends said feedback data units to said proxy, and said proxy sends said feedback data units to said sending peer (SP), where said network entity performs said modification on said feedback data units.

14. The method of claim 11, wherein said network entity receives said transmission data units from said sending peer (SP) and sends said transmission data units to said proxy, and said proxy sends said transmission data units to said receiving peer (RP), where said network entity performs said modification on said transmission data units.

15. The method of claim 11, wherein said receiving peer (RP) sends feedback data units containing information related to the receipt of said transmission data units to said sending peer (SP), said proxy receives said feedback data units from said receiving peer (RP) and sends said feedback data units to said network entity, and said network entity sends said feedback data units to said sending peer (SP), where said proxy performs said modification on said feedback data units.

16. The method of claim 1, wherein said communication network is a wireless communication network.

17. The method of claim 16, wherein said network entity is arranged to control a wireless link.

18. The method of claim 1, wherein said proxy is a transport layer proxy.

19. The method of claim 1, wherein said verification procedure comprises reading address information contained in said data units of said communication or in set-up data units exchanged for setting up said communication, and comparing said address information with stored address information.

20. The method of claim 1, wherein said verification procedure comprises the step of one or both of said proxy and said network entity sending predetermined signalling messages to the respective other communication partner of said proxy and network entity.

21. The method of claim 1, wherein one or both of said proxy and said network entity performs a determination procedure for determining the capabilities of the respective other communication partner of said proxy and network entity for reacting to said communication control related information that is different from communication control related information exchanged between said two peers.

22. The method of claim 21, wherein said determination procedure comprises reading address information contained in said data units of said communication or in set-up data units exchanged for setting up said communication, and comparing said address information with stored address information.

23. The method of claim 21, wherein said determination procedure comprises the step of one or both of said proxy and said network entity sending predetermined signalling messages to the respective other communication partner of said proxy and network entity.

24. A system for transporting data units through a communication network, said data units belonging to a communication of a predetermined layer between two peers of a predetermined protocol of said predetermined layer, said communication being carried over said communication network, the system comprising:
   a proxy of said predetermined layer arranged between said two peers, and
   a network entity for controlling a partial connection of said communication network that carries said data units,
   one or both of said proxy and said network entity being arranged to modify one or more of said data units, said modification in accordance with rules for coding information that are different from rules for coding information specified by said predetermined protocol, in order to provide communication control related information that is different from communication control related information exchanged between said two peers, and
   the respective other or both of said proxy and said network entity being arranged to perform data unit transmission control based on said communication control related information that is different from communication control related information exchanged between said two peers
   one or both of said proxy and said network entity are arranged to perform a verification procedure for verifying whether the respective other communication partner of said proxy and network entity is able to process said modified data units.

* * * * *